United States Patent
Uwazumi et al.

(10) Patent No.: US 6,579,613 B1
(45) Date of Patent: Jun. 17, 2003

(54) RECORDING MEDIUM WITH LIMITED USING PERIOD

(75) Inventors: Hiroyuki Uwazumi, Nagano (JP); Teruhisa Yokosawa, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 176 days.

(21) Appl. No.: 09/684,432

(22) Filed: Oct. 10, 2000

(30) Foreign Application Priority Data

Oct. 14, 1999 (JP) ............................................. 11-293006

(51) Int. Cl.⁷ ............................... G11B 5/66; G11B 5/70
(52) U.S. Cl. ..................... 428/336; 428/694 T; 428/900
(58) Field of Search ............................ 428/694 T, 900, 428/336; 360/135

(56) References Cited

U.S. PATENT DOCUMENTS 5,523,173 A * 6/1996 Doerner et al. ............. 428/611
5,759,617 A * 6/1998 Mukai ......................... 427/130
5,820,969 A * 10/1998 Satoh .......................... 428/141
5,879,783 A * 3/1999 Chang et al. ................ 428/141
6,188,653 B1 * 2/2001 Nagano et al. ............... 369/47

FOREIGN PATENT DOCUMENTS

| JP | 8-147856 | 6/1996 |
| JP | 08-147856 A * | 6/1996 |
| JP | 10-283653 | 10/1998 |

* cited by examiner

Primary Examiner—Holly Rickman
(74) Attorney, Agent, or Firm—Kanesaka & Takeuchi

(57) ABSTRACT

For protecting a copyright, stored digital information on a recording medium is attenuated in a certain period of time. For this purpose, the thickness of a magnetic layer and the diameter of magnetic crystal grain are changed to control the effect of the thermal oscillation on magnetization of a crystalline region to thereby provide the recording medium with digital information retained for a certain period of time, and attenuated along with time.

8 Claims, No Drawings

RECORDING MEDIUM WITH LIMITED USING PERIOD

BACKGROUND OF THE INVENTION AND RELATED ART STATEMENT

The present invention relates to a recording medium with limited using period for copyright protection suitable for recording copyrighted digital information.

Conventionally, a recording medium, in which digital information is recorded and stored, has been designed and manufactured such that the stored information is not attenuated in order to keep the recording medium in a stable condition as much as possible. Accordingly, digital information once recorded in the medium has usually been retained for years unless it was deliberately erased or overwritten.

However, as digital broadcasting has begun or digital communication has been spread, digital information has major problems concerning copyright infringement, which requires an urgent solution. The medium with the performance of storing digital information for years is likely to violate a copyright in itself unless it provides a usufructuary period of time or there is a restriction on a number of time regarding reproduction.

Japanese Laid Open Patent Publication (KOKAI) No. 10-283653 discloses an optical recording medium and an optical readout equipment enabling stored information in the medium to be erased while being read out when a usufructuary period of time expires. Japanese Laid Open Patent Publication (KOKAI) No. 8-147856 discloses a photodisk, a photomagnetic disk, and a readout equipment prohibiting unlimited use of digital data and validity in protecting a copyright.

Object of the present invention is to offer a recording medium suitable for copyright protection, in which stored digital information is attenuated in a certain period of time.

SUMMARY OF THE INVENTION

Recording medium in which stored digital information is attenuated in a certain period of time seems to offer a solution for copyright protection against the storing ability of digital information in a medium. Accurately recorded, gradually attenuated, and finally extinct digital information permits a recording medium to eliminate the possibility of infringing, etc. on a copyright in the recording of copyrighted digital information.

Storing ability of digital information in the magnetic recording medium, among others, was investigated from this viewpoint. Investigation reveals that stored digital information, which is magnetization of a crystalline region in a magnetic layer, is susceptible to thermal oscillation in a crystal lattice even at a room temperature, when the thickness or crystal grain diameter in a magnetic layer is diminished, so that the thermal oscillation disturbs magnetization direction, and extinguishes the stored magnetic information.

This suggests that with the advantage of the susceptibility, which must be eliminated in conventionally manufacturing a medium, it may possibly provide a magnetic recording medium feasible for achieving the object. Keen examination on feasibility indicates that appropriate thickness and crystal grain diameter in a magnetic layer for controlling the effect of thermal oscillation on the recording medium provides the recording medium with digital information retained for a period of time and attenuated along with time.

Magnetization M of a ferromagnetic attenuates with time t through the action of thermal energy. The following general formulae (1) and (2) represent a variation in magnetization M with time.

$$M(t)=M(0)\exp(-t/\tau) \quad (1)$$

$$1/\tau=f_o\exp(-K_u v/k_B T) \quad (2)$$

where $M(t)$ denotes residual magnetization at time t, and $\tau$ is time constant of magnetization attenuation. And $f_o$ signifies frequency factor (about $10^9$/s), $K_u$ is a constant of energy of uniaxial magnetic anisotropy in a magnetic crystal grain, v is the volume of magnetization reversal, $k_B$ is Boltzmann constant, and T is temperature (K), respectively.

Formulae (1) and (2) indicate that as the product $K_u v$ becomes smaller, the attenuation of magnetization M with time becomes greater. $K_u$ value in formula (2) is subject to composition of magnetic grains, and v is determined by a diameter of a magnetic crystal grain and interaction among magnetic crystal grains. Magnetization M of a cobalt-chromium alloy thin film magnetic layer which is applied in a conventional magnetic recording medium is likewise a function of $K_u v/k_B T$, and attenuates in proportion to the reverse exponential of time t, that is, decreases linearly with time t expressed in the logarithmic scale on a chart.

While $K_u$ value, a factor for controlling attenuation, is subject to the composition of a magnetic layer, v value depends on microstructure of the magnetic layer, including thickness, crystal grain diameter, and segregation of impurities at grain boundaries. Hence, manufacturing condition of the magnetic layer controls v value.

Findings reveal that the thickness of a magnetic layer of 200 Å or less, or the diameter of a crystal grain of 100 Å or less provides a magnetic recording medium with stored digital information attenuated by 50% or more in a year. In order to obtain a desired magnetization attenuation, it is preferable to form the thickness of a magnetic layer with 200 Å or less and crystal grain diameter of 100 Å or less. Attenuation of 1% or less in a day requires the thickness of the magnetic layer from 100 Å to 200 Å and the diameter of the crystal grain from 50 Å to 100 Å.

A first recording medium for copyright protection of the present invention comprises a non-magnetic substrate and an intelligent layer. The intelligent layer is formed above or on the non-magnetic substrate, and stores digital information. The digital information is attenuated spontaneously by 50% or more in a year.

A second recording medium for copyright protection of the present invention comprises a non-magnetic substrate and an intelligent layer. The intelligent layer is formed above or on the non-magnetic substrate, and stores digital information. The digital information is attenuated spontaneously by 50% or more in one month.

A third recording medium for copyright protection of the present invention comprises a non-magnetic substrate and an intelligent layer. The intelligent layer is formed above or on the non-magnetic substrate, and stores digital information. The digital information is attenuated spontaneously by 5% or less in a day and 50% or more in one month.

A fourth recording medium for copyright protection of the present invention stores magnetization at a crystalline region in a magnetic layer. Magnetization in crystalline region stands for digital information, and the magnetic layer stands for the intelligent layer in a first, second, or third recording medium.

A fifth recording medium for copyright protection of the present invention takes advantage of thermal oscillation in a crystal lattice of the magnetic layer as set forth in a fourth recording medium, magnetization of the crystalline region being attenuated spontaneously.

A sixth recording medium for copyright protection of the present invention has the thickness of the magnetic layer of 200 Å or less, thereby controlling the thermal oscillation in the crystal lattice of the magnetic layer as set forth in a fifth recording medium.

A seventh recording medium for copyright protection of the present invention has a diameter of a crystal gain of 100 Å or less, thereby controlling the thermal oscillation in the crystal lattice of the magnetic layer as set forth in the fifth recording medium.

An eighth recording medium for copyright protection of the present invention has the thickness of the magnetic layer of 200 Å or less, and the diameter of the magnetic crystal grain from 50 Å to 100 Å to control thermal oscillation in the crystal lattice of the magnetic layer as set forth in the fifth recording medium, magnetization of a crystalline region being attenuated by 5% or less in a day and 50% or more in a month or more.

A ninth recording medium for copyright protection of the present invention has the magnetization of the crystalline region attenuated by 5% or less in a day and 50% or more in a month or more at 23° C. when the digital information is recorded at a frequency of 100 MHz in the magnetic layer as set forth in the fifth recording medium.

A tenth recording medium for copyright protection of the present invention has the magnetization of a crystalline region attenuated by 5% or less in a day and 50% or more in a month or more at 23° C. when magnetization of the crystalline region in the magnetic layer as set forth in the fifth recording medium is saturated in the medium cut into chips with 8 mm long and 8 mm wide in a certain direction.

An eleventh recording medium for copyright protection of the present invention is made of plastics for a non-magnetic substrate as set forth in any of the preceding recording medium.

DETAILED DESCRIPTION OF PREFERRED EMBODIMENTS

Examples of the present invention will be explained below for illustration, not limiting the scope of the invention.

A non-magnetic chromium under layer with 500 Å thick, a cobalt-chromium-platinum-tantalum alloy magnetic layer with prescribed thickness, and a carbon protective layer with look thick, were formed on a smooth glass substrate successively with a sputtering technique. Then, a liquid lubricating layer with 15 Å thick is applied on the carbon protective layer to form a magnetic recording medium. The thicknesses of the magnetic layers were changed from 50 Å to 300 Å.

Table 1 shows the respective ratios of attenuation in magnetization in a day, one month and a year to initial magnetization in terms of the readout of a recording medium. A recording medium was read out with a GMR head at a track recording density of 200 kFCI. Table 1 further shows the diameters of the crystal grains in the respective thicknesses of the magnetic layers.

TABLE 1

| Magnetic layer thickness (Å) | Grain diameter (Å) | Attenuation in a day (%) | Attenuation in one month (%) | Attenuation in a year (%) |
| --- | --- | --- | --- | --- |
| 50 | 55 | 9 | 94 | 100 |
| 100 | 82 | 4 | 71 | 100 |
| 150 | 121 | 3 | 55 | 100 |
| 200 | 173 | 0 | 6 | 53 |
| 250 | 210 | 0 | 1 | 16 |
| 300 | 239 | 0 | 0 | 2 |

Table 1 shows that the thicknesses of the magnetic layers of about 200 Å or less provide readout attenuation ratios of 50% or more in a year, and the diameters of the crystal grains of about 100 Å or less provide readout attenuation ratios of 50% or more in one month. And, the thickness of the layer of about 50 Å provides a readout attenuation ratio of no less than 9% even in a day, which does not function as a recording medium properly.

Gradually attenuated digital information in a recording medium results in a temporary recording system that protects a copyright to digital information effectively. Controlling the thicknesses of the magnetic layer and the diameter of the crystal grain in a magnetic recording medium causes magnetization of a crystalline region to attenuate in a desired period of time.

While the invention has been explained with reference to the specific embodiments of the invention, the explanation is illustrative and the invention is limited only by the appended claims.

What is claimed is:

1. A recording medium for copyright protection, comprising:

a non-magnetic substrate; and a CoCrPtTa magnetic layer formed above said non-magnetic substrate and having a crystalline region to be magnetized for storing digital information, said magnetic layer having a thickness greater than 50 Å and less than or equal to 150 Å and a magnetic crystal grain between 50 Å and 10 Å so that said digital information stored in the magnetic layer is attenuated spontaneously within one year by at least 50% in one month.

2. A recording medium according to claim 1, wherein said digital information is attenuated by at most 5% in a day.

3. A recording medium according to claim 1, wherein said crystalline region has a crystal lattice with thermal oscillation, magnetization of the crystalline region being attenuated spontaneously through the thermal oscillation in the crystal lattice in the magnetic layer.

4. A recording medium according to claim 3, wherein said thermal oscillation is controlled with the thickness of the magnetic layer.

5. A recording medium according to claim 3, wherein said thermal oscillation is controlled with the diameter of the magnetic crystal grain.

6. A recording medium according to claim 1, wherein said magnetization of the crystalline region is attenuated by at most 5% in a day and at least 50% in one month at 23° C. when the digital information is recorded at a frequency of 100 MHz.

7. A recording medium according to claim 1, wherein said non-magnetic substrate is a plastic substrate.

8. A recording medium for copyright protection, comprising:

a non-magnetic substrate; and a magnetic layer formed, above said, non-magnetic substrate and having a thickness of more than 50 Å, and less than or equal to 200 Å and a crystalline region to be magnetized for storing digital information, said crystalline region having a crystal lattice with thermal oscillation, magnetization of the crystalline region being attenuated spontaneously through the thermal oscillation in the crystal lattice in the magnetic layer by at most 5% in a day and at least 50% in one month or more at 23° C. when the magnetization of the crystal region in the medium having a chip size of 8 mm long and 8 mm wide is saturated in a certain direction so that said digital information is attenuated spontaneously at a desired rate in a predetermined period of time.

* * * * *

UNITED STATES PATENT AND TRADEMARK OFFICE
CERTIFICATE OF CORRECTION

PATENT NO. : 6,579,613 B1
DATED : June 17, 2003
INVENTOR(S) : Hiroyuki Uwazumi et al.

It is certified that error appears in the above-identified patent and that said Letters Patent is hereby corrected as shown below:

Column 3,
Line 54, change "look" to -- 100 Å --;

Column 4,
Line 45, change "10 Å" to -- 100 Å --;

Column 5,
Line 5, delete comma after "50 Å";
Line 6, add comma after "200 Å"; and Column 6,
Line 4, change "crystal" to -- crystalline --.

Signed and Sealed this

Twenty-eighth Day of October, 2003

JAMES E. ROGAN
*Director of the United States Patent and Trademark Office*